Jan. 18, 1944.   P. E. HAWKINSON   2,339,696
TIRE RETREADING MOLD
Filed Aug. 10, 1942   2 Sheets-Sheet 1
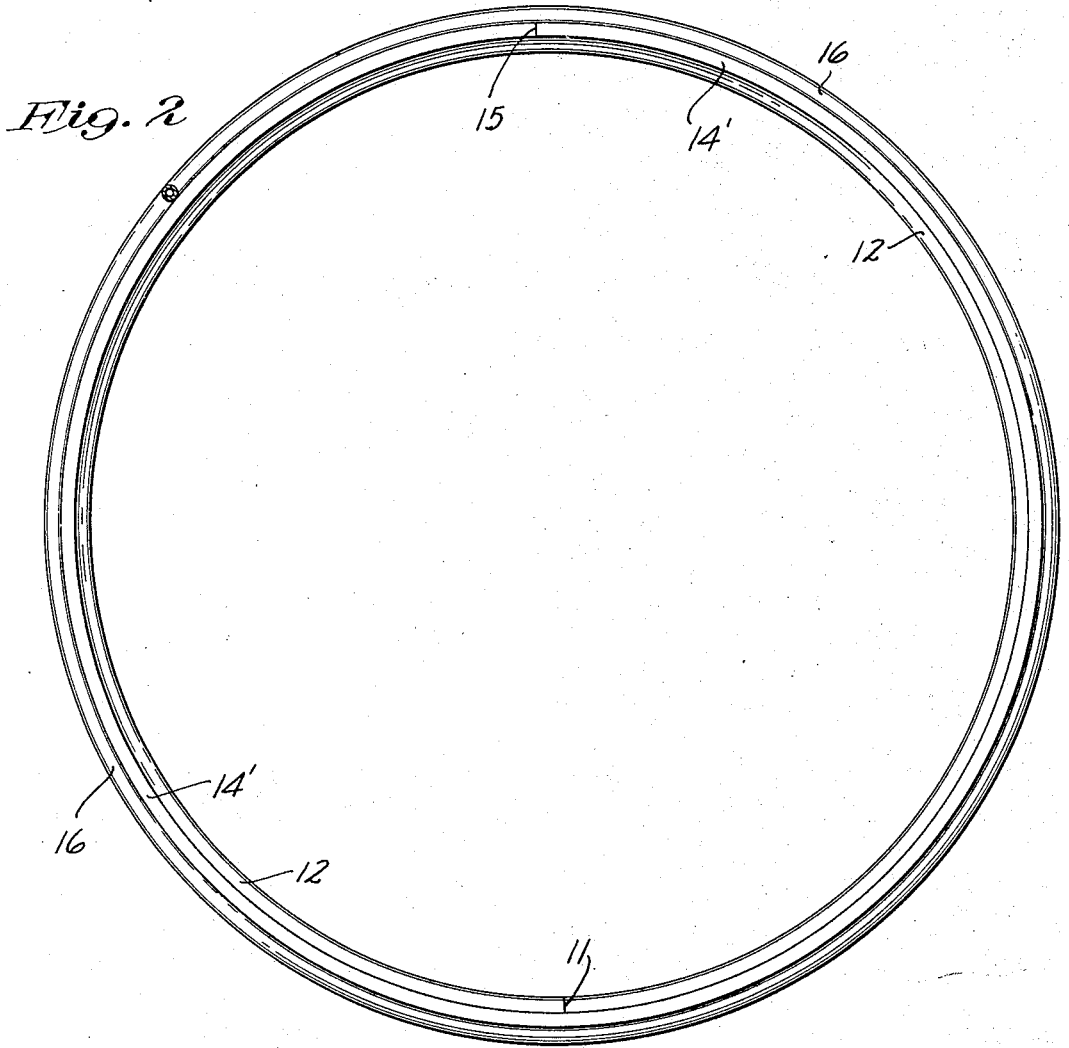
Inventor
Paul E. Hawkinson
By his Attorneys Jan. 18, 1944.  P. E. HAWKINSON  2,339,696
TIRE RETREADING MOLD
Filed Aug. 10, 1942  2 Sheets-Sheet 2
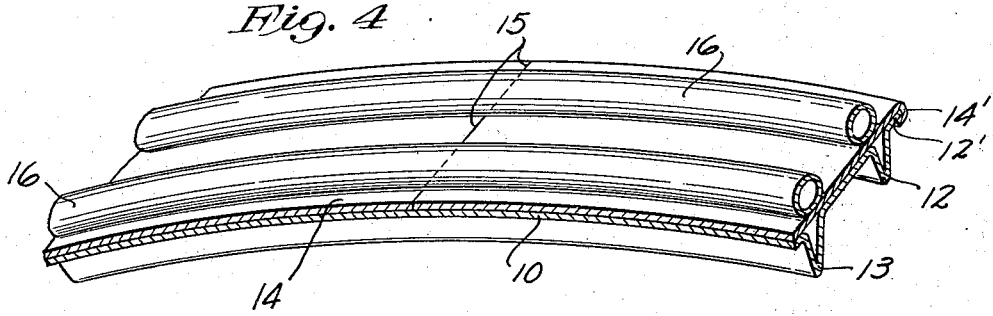
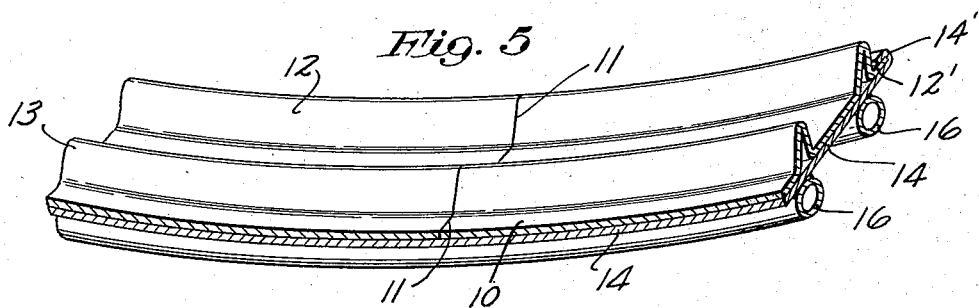
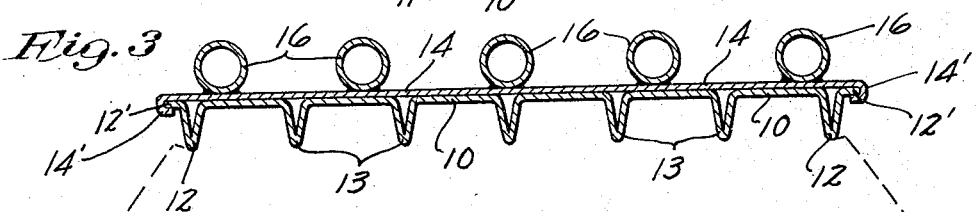
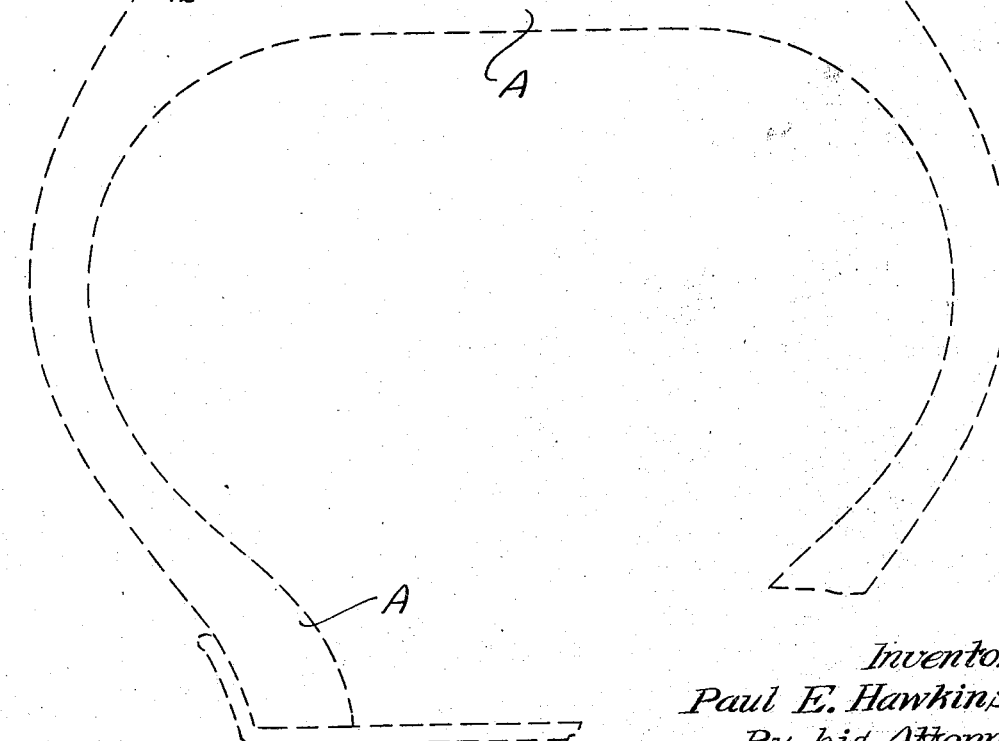
Inventor
Paul E. Hawkinson
By his Attorneys Patented Jan. 18, 1944

2,339,696

UNITED STATES PATENT OFFICE 2,339,696

TIRE RETREADING MOLD

Paul E. Hawkinson, Minneapolis, Minn., assignor to Paul E. Hawkinson Company, Minneapolis, Minn., a corporation of Minnesota Application August 10, 1942, Serial No. 454,265

5 Claims. (Cl. 18—18)

My present invention provides an improved mold for use in the retreading of pneumatic tires; and, generally stated, consists of the novel devices, combinations of devices and arrangement of parts hereinafter described and defined in the claims.

Particularly, this invention is an improvement on the so-called matrix or mold disclosed in my prior Patents Nos. 1,917,261 and 1,917,262. Such molds are extensively used in connection with the commercially well-known "Hawkinson System" of retreading pneumatic tires and are flat or substantially flat in transverse cross section. The diametrically opposite sides of these molds are parallel so that the mold may be said to be cylindrical.

As hitherto generally constructed, the matrix has been made from sheet steel strips crimped cross-sectionally to form circumferentially extended sealing ribs, and sometimes also tread design forming ribs; and the ends of the matrix forming sheet were then united by welding or brazing. Matrixes or molds thus made would, under expanding pressure of a tire placed therein and inflated, tend to spread laterally and expand circumferentially and, moreover, the welded or brazed joints were frequently not as strong as the main body of the matrix.

My present invention overcomes the above defects and produces a stronger, safer, more efficient, and better appearing mold. The invention involves not only the improved mold or article, but an improved process of producing the same. In this specification the terms "welding or brazing" are used synonymously.

In the description of this improved device, the "mold," is described as made up of two important elements, to wit: the matrix or curing ring and a reinforcing band.

In accordance with my invention I first make the matrix or curing ring from a ribbon-like metal strip, by bending the same into cylindrical form and rigidly connecting the abutting ends thereof by welding. The mold is then completed by making a reinforcing band out of a ribbon-like sheet or strip of metal, preferably steel, which is then placed around the matrix and set with the joint at its abutting ends circumferentially offset from the welded joint of the abutting ends of the matrix. The joint formed by the abutting ends of the reinforcing band should be set diametrically opposite the joint of the matrix.

A commercial form of the improved device is illustrated in the accompanying drawings wherein like characters indicate like parts throughout the several views.

Referring to the drawings:

Fig. 1 is a plan view of the complete retreading mold;

Fig. 2 is a side elevation of the mold shown in Fig. 1;

Fig. 3 is a transverse section taken on the line 3—3 of Fig. 1, showing the parts on a larger scale; and Figs. 4 and 5 are fragmentary sections on the same scale as Fig. 3 taken in section on the line 4—5 of Fig. 1 and showing, respectively, upper and lower portions of the mold.

In Fig. 3 the cross-section of a pneumatic tire casing is indicated by dotted lines by the character A. The matrix or curing ring, indicated by numeral 10, is made of sheet metal, preferably sheet steel, and is bent into cylindrical form with its ends abutting at 11. This curing ring, at or near its edges, is crimped or corrugated to form endless sealing ribs 12 and also intermediate tread design forming ribs 13. The sealing ribs 12, in this preferred arrangement, have outturned flanges 12'.

Placed around and closely engaging the exterior of the curing ring 10 is a reinforcing band 14, preferably also of sheet steel, bent into cylindrical form and having its abutting ends united at 15. The extreme edges of the reinforcing band 14 are crimped or bent at 14' to embrace the edge flanges 12' of the matrix or sealing ring 10. The means for applying heat to the mold is applied around the exterior of the reinforcing band 14. The means for this purpose, illustrated in the drawings, is a coiled steam pipe 16 preferably welded to the exterior thereof.

The preferred method or manner of producing this mold is as follows: First, the matrix or curing ring 10 is produced and its abutting ends 11 are united by welding produced either electrically or by an acetylene torch, the latter operation being the one that I have employed in practice. This welding will frequently produce a roughness on the interior and exterior of the curing ring which should be ground off before the reinforcing band is applied. When the ends are thus welded the curing ring becomes an annular sheet metal structure.

As the next step the clamping band 14 will be produced of a diameter which will tightly fit around the endless annular curing ring or matrix. In the initial application of the clamping band around the curing ring, the flanges 14' may be turned inward at right angles with the cross-section thereof. Preferably, the clamping band is made of such length that when placed in close, but not the closest possible contact with the curing ring, there will be a space about 1/16 of an inch between the abutting ends of said clamping band. Next, by tightly drawing a cable or chain around the clamping band, it is contracted into very tight and close engagement with the said curing ring and while under such compressing strain, the heat is applied to the joint 15 and as the molten metal is inserted between the abutting ends of said joint 15, there will be an expansion of the clamping band which will bring the abutting ends thereof into the closest kind of engagement; and then when the welded joint cools and solidifies, the now endless annular clamping band will be contracted into very tight and close contact with the curing ring. After this has been done, the flanges 14' can be clinched or turned inward, as shown in Fig. 3, thereby uniting the curing ring and reinforcing band into the most intimate kind of connection and preventing the curing ring from being expanded, either radially or laterally, under pressure produced thereon in the curing of the retread.

As a last operation the heating means or coiled tube 16 will be applied around and welded or rigidly secured to the clamping band.

It is, of course, highly important that the welded joints 11—15 be spaced out of alignment circumferentially of the mold and, as already stated, the best arrangement is to place the said welded joints at diametrically opposite points in the mold.

In the preferred and above described arrangement of the mold, the clamping band, in transverse cross-section, is straight or, otherwise stated, the clamping band has parallel sides and is therefore of true cylindrical form so that the mold is adapted to apply to tire casings treads that are transversely flat.

What I claim is:

1. A tire retreading mold comprising an endless annular sheet metal curing ring, an endless annular sheet metal reinforcing band applied tightly over and embracing the outer surface of the curing ring, and heating means in contact with the exterior of the reinforcing band, said curing ring and reinforcing band being substantially flat in transverse cross section, said sheet metal curing ring being radially inwardly corrugated closely adjacent but slightly inwardly spaced from the marginal edges thereof to provide closely adjacent said marginal edges radially inwardly projecting endless annular sealing ribs and laterally extending endless annular flanges immediately adjacent said sealing ribs, said reinforcing band being initially somewhat wider than the underlying curing ring and having its annular edge portions crimped around and under the said marginal flanges of the curing ring.

2. The structure defined in claim 1, in which the said sheet metal spring ring is also corrugated intermediate the sealing ribs thereof to provide radially inwardly extending annular tread design-forming ribs.

3. The structure defined in claim 1, in which the heating means is in the nature of a steam-conducting coil applied around the exterior of the clamping band in direct heat-conducting contact therewith.

4. The structure defined in claim 1, in which the said sheet metal curing ring is also corrugated intermediate the sealing ribs thereof to provide radially inwardly extending annular tread design-forming ribs, and in which the heating means is in the nature of a steam-conducting coil applied around the exterior of the reinforcing band in direct heat-conducting contact therewith.

5. The structure defined in claim 1, in which the curing ring and clamping band are both initially transversely split and are formed endless by welding the abutting ends together, the welded joint of the clamping band being diametrically opposite the welded joint of the curing ring.

PAUL E. HAWKINSON.